United States Patent
Wang

(10) Patent No.: US 6,307,274 B1
(45) Date of Patent: Oct. 23, 2001

(54) POWER GENERATOR FOR A DIGITAL CASSETTE CARTRIDGE

(75) Inventor: Mao-Sui Wang, Taipei (TW)

(73) Assignee: Leadtek Research Inc. (TW)

( * ) Notice: Subject to any disclaimer, the term of this patent is extended or adjusted under 35 U.S.C. 154(b) by 0 days.

(21) Appl. No.: 09/557,320

(22) Filed: Apr. 25, 2000

(30) Foreign Application Priority Data

Oct. 14, 1999 (TW) ............................................. 88117750 A

(51) Int. Cl.⁷ ....................................................... H02P 9/04
(52) U.S. Cl. ............................. 290/1 A; 360/90; 310/83
(58) Field of Search .............................. 290/1 A; 310/83, 310/103, 118; 368/204; 360/90

(56) References Cited

U.S. PATENT DOCUMENTS

| | | | |
|---|---|---|---|
| 3,779,483 | * | 12/1973 | Inoue ..................................... 242/357 |
| 3,800,212 | * | 3/1974 | Branco et al. ........................ 322/28 |
| 4,001,887 | * | 1/1977 | Platt et al. ............................. 360/90 |
| 4,333,172 | * | 6/1982 | Chen ...................................... 369/2 |
| 5,614,779 | * | 3/1997 | Zafferri ................................. 310/118 |
| 5,668,414 | * | 9/1997 | Takahashi et al. ................... 290/1 E |
| 5,821,658 | * | 10/1998 | Boggs, III ............................. 310/105 |

FOREIGN PATENT DOCUMENTS

| | | | |
|---|---|---|---|
| 0751445A1 | * | 1/1977 | (EP) . |
| 11089121A | * | 3/1999 | (JP) . |
| 8401041 | * | 3/1984 | (WO) . |

* cited by examiner

Primary Examiner—Joseph Waks
(74) Attorney, Agent, or Firm—Rabin & Champagne PC

(57) ABSTRACT

A power generator for a Digital Cassette Cartridge, which is put into a cassette player for playing back the digital audio files stored in the Digital Cassette Cartridge. The cassette player contains a reel shaft for driving the power generator of the Digital Cassette Cartridge. The power generator includes two gears, a magnetic object, a coil and a power supply. The first gear is coaxially engaged with the reel shafts. The second gear rotates as the first gear rotates. The magnetic object is coaxially mounted and is conjointly rotatable with the second gear. The coil produces an alternating current source when the magnetic object rotates. The power supply receives the alternating current and converts the alternating current to a direct current source.

10 Claims, 4 Drawing Sheets

POWER GENERATOR FOR A DIGITAL CASSETTE CARTRIDGE

BACKGROUND OF THE INVENTION

This application incorporates by reference Taiwanese application serial No. 88117750, filed Oct. 14, 1999.

1. Field of the Invention

The invention relates to a power generator, and more particularly to a power generator for a digital cassette cartridge in a cassette player.

2. Description of the Related Art

Audio cassette players or audio cassette recorders are widely used in daily life, for example, the audio cassette players equipped in vehicles, portable cassette players, and high-fidelity audio equipment for home entertainment.

As information technology and Internet are in widespread use, a large amount of audio information is converted into digital form and compressed using different compression formats, such a Motion Picture Engineering Group Audio Layer 3 (MPEG audio layer 3 or MP3) format. The compressed digital audio files have the advantages of convenience of storage, transmission, processing and improving the quality of playback and recording. When it comes to playing back, these digital audio files must be decompressed and processed by a multi-media computer or dedicated digital playback equipment compliant to the compression format, such as MP3 player.

For the sake of playing back the digital audio files with the conventional audio cassette players, a Digital Cassette Cartridge was invented. A Digital Cassette Cartridge has a housing shaped like an ordinary cassette tape, and it is designed to fit conventional audio cassette players for playing back the digital audio files stored in this Digital Cassette Cartridge. The Digital Cassette Cartridge includes electronic devices, such as memory and processors, for the storage of digital audio files and conversion of digital audio files into an audio signal. The audio signal is transmitted to the audio cassette player that the Digital Cassette Cartridge is put into. Therefore, a power supply for the electronic devices must be included into the Digital Cassette Cartridge because the Digital Cassette Cartridge is put into the cassette player where an external power cable cannot connect. In regard to this implementation problem, a possible approach is to equip the Digital Cassette Cartridge with batteries. However, since the Digital Cassette Cartridge is small in size, it is not suitable to be equipped with batteries of high capacity of energy. Thus, if the time of playback audio data is longer than the time that the batteries can supply power for the Digital Cassette Cartridge, users are required to replace the batteries frequently with fully charged ones. It makes the use of the Digital Cassette Cartridge inconvenient and reduces the purchaser's demand to the Digital Cassette Cartridge.

SUMMARY OF THE INVENTION

It is therefore an object of the invention to provide a power generator for a Digital Cassette Cartridge. The power generator is equipped in the Digital Cassette Cartridge. When the Digital Cassette Cartridge is put into a cassette player and then a user presses the "Play" button of the cassette player, the power generator is driven by the rotating reel shaft that is designed for rotating the magnetic reels of ordinary cassette tapes. The power generator then produces electrical power suitable for the electronic devices inside the Digital Cassette Cartridge for operations such as playing back. By utilizing the power generator according to a preferred embodiment of the invention, the Digital Cassette Cartridge can operate properly without any battery with any cassette player, making it convenient to users.

In accordance with the object of the invention, a power generator for a Digital Cassette Cartridge, which is put into a cassette player for playing back the digital audio files stored in the Digital Cassette Cartridge, is provided. The cassette player contains a reel shaft for driving the power generator of the Digital Cassette Cartridge. The power generator includes two gears, a magnetic object a coil and a power supply. The first gear is coaxially engaged with the reel shaft. The second gear rotates as the first gear rotates. The magnetic object is coaxially mounted and is conjointly rotatable with the second gear. The coil produces an alternating current as the magnetic object rotates. The power supply receives the alternating current and converts the alternating current to a direct current, which is suitable for the operation of the Digital Cassette Cartridge.

As for the way of driving the second gear, the first gear can engage with the second gear or the first gear can drive the second gear by a roller chain. The first gear and second gear can also be replaced with other rotatable objects, such as wheels. In the approach of using the wheels, the first wheel can drive the second wheel by friction or through a transmission belt.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 1:
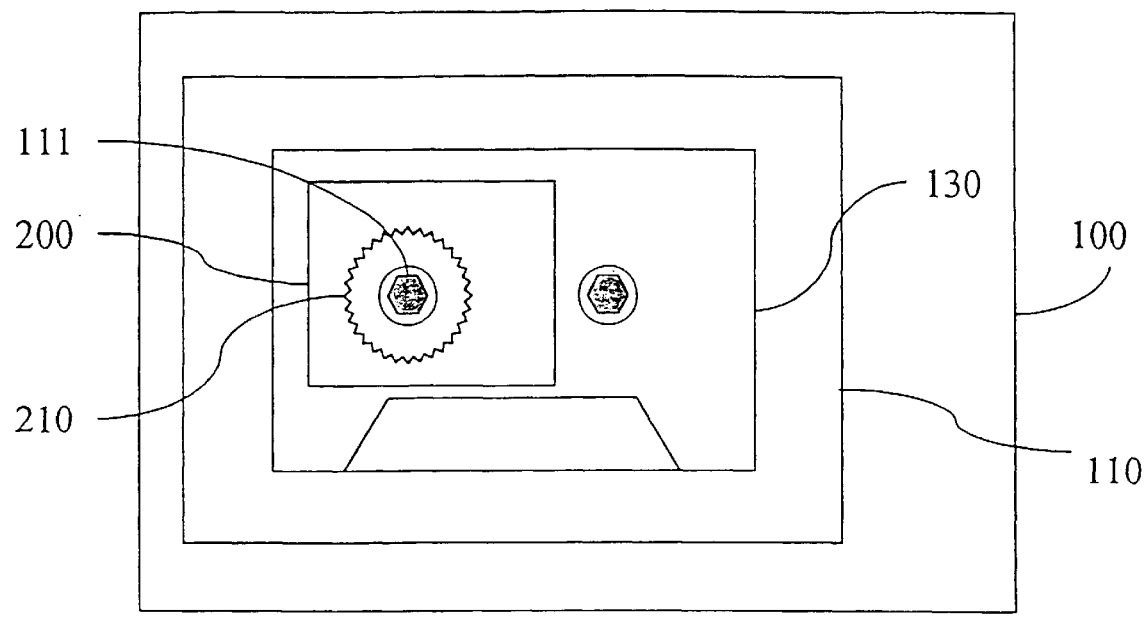
FIG. 1 is an illustration of a Digital Cassette Cartridge equipped with a power generator according to the preferred embodiment of the invention, in a cassette player.

Referring to FIG. 1, a Digital Cassette Cartridge equipped with a power generator in accordance with the preferred embodiment of the invention, in a cassette player, is illustrated. As illustrated in FIG. 1, the power generator 2000 is inside the Digital Cassette Cartridge housing 130. The power generator 200 includes a gear 210 which is engaged with a reel shaft 111 of the cassette player 100 after putting the Digital Cassette Cartridge housing 130 into the cassette case 110 of the cassette player 100.

Figure 2:
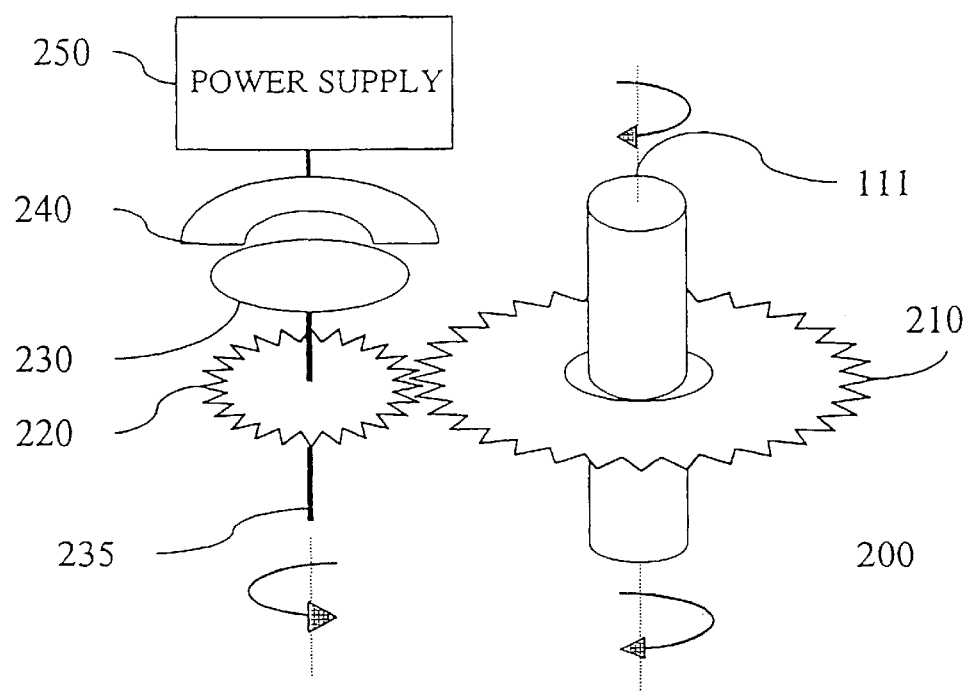
FIG. 2 is a structural diagram of the power generator according to the preferred embodiment of the invention for a Digital Cassette Cartridge, that uses meshing gears.

Referring now to FIG. 2, the structural diagram of the power generator in accordance with the preferred embodiment of the invention for a Digital Cassette Cartridge is shown. The cassette player 100 has a reel shaft 111 for driving the power generator 200. The power generator 200 includes: a gear 210, a gear 220, a magnetic object 230, preferably a magnetic disk, a coil 240 and a power supply 250. The gear 210 is coaxially engaged with the reel shaft 111. The gear 220 is engaged with the gear 210. the magnetic object 230 is coaxially mounted and conjointly rotatable with the gear 220 pivoted on a shaft 235. The coil 240 is mounted and produces an alternating current source by the effect of cutting lines of magnetic force when the magnetic object 230 rotates. The power supply 250 receives the alternating current source and converts the alternating current to a direct current source, which is suitable for the operation of the Digital Cassette Cartridge.

To play back the digital audio files, the "Play" button of the cassette player 100 should be pressed so as to make the reel shaft 111 rotate. The rotating reel shaft 111 drives the gear 210 at the same angular speed. The gear 220 that is smaller in diameter than the gear 210 rotates at an angular speed faster than that of the gear 210, and the magnetic object 230 rotates at the same angular speed as that of the gear 220. The coil 240 produces an alternating current source by the effect of cutting lines of magnetic force when the magnetic object 230 rotates. Then, the power supply 250 converts the alternating current to a direct current source, which is suitable for the operation of the Digital Cassette Cartridge.

To play back the digital audio files, the "Play" button of the cassette player 100 should be pressed so as to make the reel shaft 111 rotate. The rotating reel shaft 111 drives the gear 210 at the same angular speed. The gear 220 that is smaller in diameter than the gear 210 rotates at an angular speed faster than that of the gear 210, and the magnetic object 230 rotates at the same angular speed as that of the gear 220. The coil 240 produces an alternating current source by the effect of cutting lines of magnetic force when the magnetic object 230 rotates. Then, the power supply 250 converts the alternating current to a direct current source, which is suitable for the operation of the Digital Cassette Cartridge.

Figure 4:
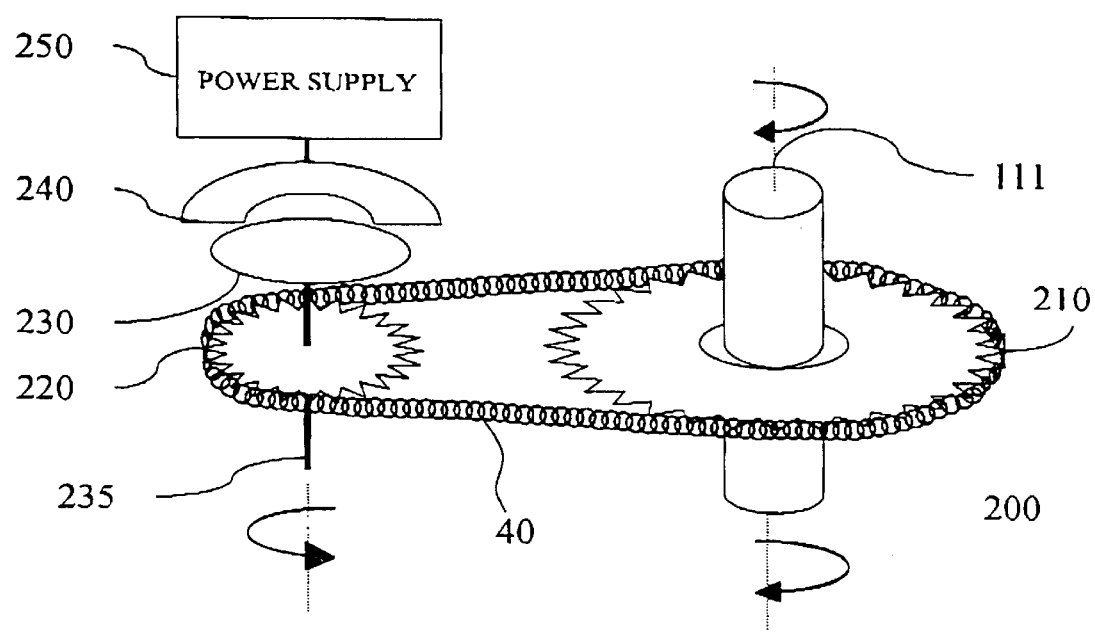
FIG. 4 is an alternative embodiment of the power generator, using gears interconnected via a rolling chain.

As shown in FIG. 2, the gear 220 is engaged with and driven by the gear 210. The gear 210 can also drive the gear 220 through a roller chain 40 (FIG. 4). Instead of applying gears, the power generator 200 can adopt non-gear objects, such as wheels.

Figure 3:
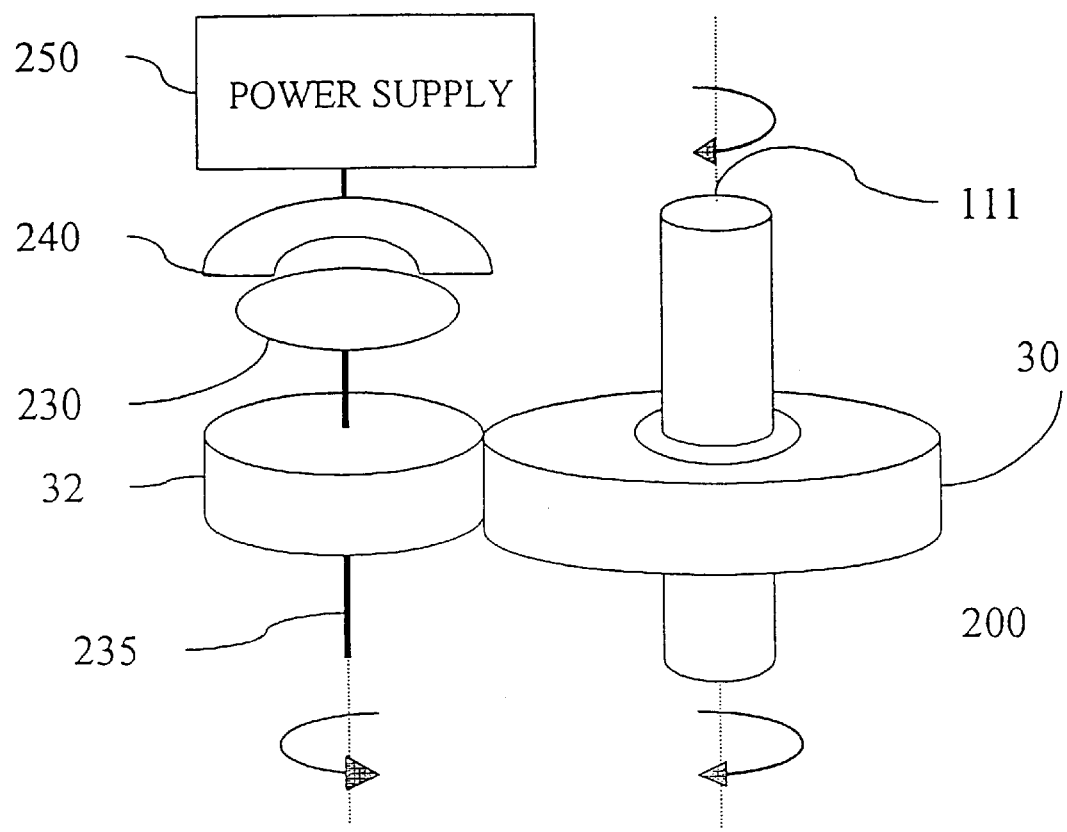
FIG. 3 is a structural diagram of an alternative embodiment of the power generator, using frictionally engaged wheels instead of gears.
Figure 5:
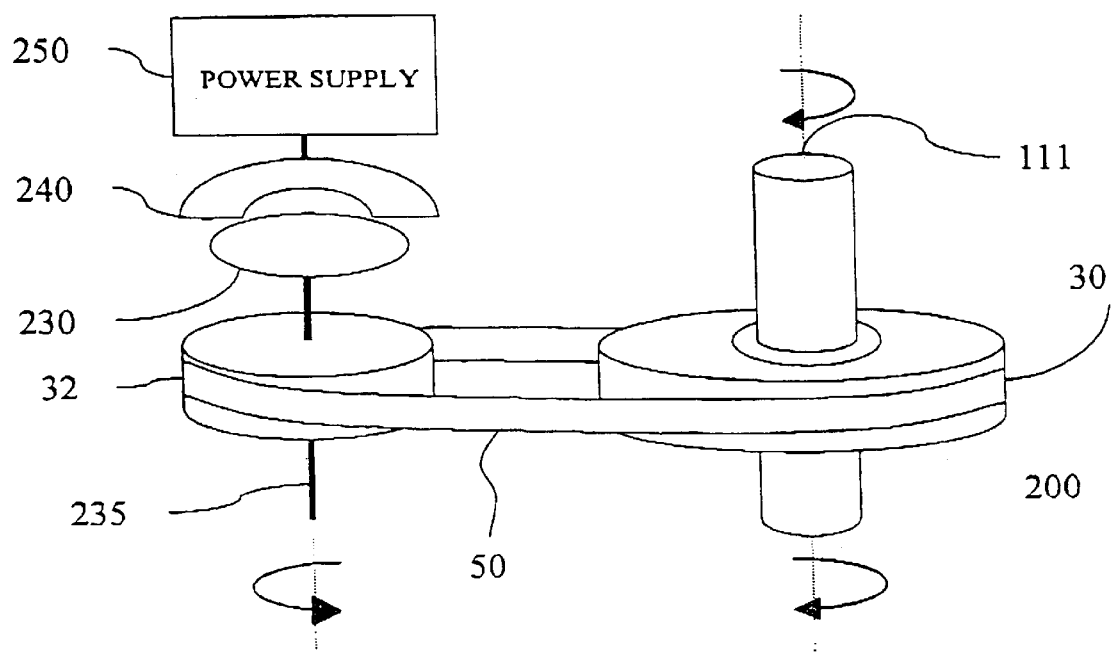
FIG. 5 is an alternative embodiment of the power generator, using wheels interconnected through a transmission belt.

Referring to FIG. 3, it is shown that the power generator has two wheels instead of the gear 210 and the gear 220. As shown in FIG. 3, the reel shaft 111 coaxially engages the wheel 30 of the power generator 200 and the real shaft 111 drives the wheel 30 so as to drive the wheel 32. The wheel 30 drives the wheel 32 by friction. In addition to driving by friction, the wheel 30 can also drive the wheel 32 through a transmission belt 50 (FIG. 5).

In order to generate power for the Digital Cassette Cartridge in the preferred embodiment of the invention, the gear 220 (or the wheel 32) is preferably designed to be smaller in diameter than the gear 210 (or the wheel 30). Thus, the gear 220 (or the wheel 32) and the magnetic object 230 rotate at an angular speed faster than that of the gear 219 (or the wheel 30). The angular speed of the magnetic object 230 relates to the induced electrical magnetic force (EMF), In the implementation of the preferred embodiment of the invention, the coil 240, the magnetic object 230 and the diameters of the gear 210 and the gear 220 are modified for meeting the electrical requirements for the Digital Cassette Cartridge.

The object of the invention is to provide a power generator for the Digital Cassette Cartridge using the rotating reel shaft of the cassette player to generate power for the Digital Cassette Cartridge to operate without using batteries. The power generator according to a preferred embodiment of the invention is able to sufficiently supply power to small electronic devices, which need 3.3 Volt working voltage and 0.5 Watt working power for normal operation. Therefore, the Digital Cassette Cartridge with the power generator is more convenient in use, and benefits from the reduction of hardware cost but without the inconvenience brought by using batteries.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A Digital Cassette Cartridge, comprising:
    a housing adapted to be inserted within a cassette player; and a power generator actuatable by the cassette player, when said housing is inserted within the cassette player, the power generator including:
        a first gear coaxially and removably engageable with a reel shaft of the cassette player when said housing is inserted within the cassette player;
        a second gear, wherein the second gear rotates as the first gear rotates;
        a magnetic object coaxially mounted and conjointly rotatable with the second gear;
        a coil, the coil producing an alternating current source when the magnetic object rotates; and
        a power supply, the power supply converting the alternating current to a direct current source; wherein
    when said housing is inserted within the cassette player, actuation of the power generator allows the digital cassette cartridge to play back digital audio files.

2. A Digital Cassette Cartridge according to claim 1, wherein the magnetic object is a magnetic disk.

3. A Digital Cassette Cartridge according to claim 1, wherein a diameter of the second gear is smaller than a diameter of the first gear.

4. A Digital Cassette Cartridge according to claim 1, wherein the first gear engages with the second gear.

5. A Digital Cassette Cartridge according to claim 1, wherein the first gear drives the second gear through a roller chain.

6. A Digital Cassette Cartridge, comprising:
    a housing adapted to be inserted within a cassette player; and
    a power generator actuatable by the cassette player, when said housing is inserted within the cassette player, the power generator including:
        a first wheel coaxially and removable engageable with a reel shaft of the cassette player when said housing is inserted within the cassette player;
        a second wheel. the second wheel rotating as the first wheel rotates;
        a magnetic object coaxially mounted and conjointly rotatable with the second wheel;
        a coil, the coil producing an alternating current source when the magnetic object rotates; and
        a power supply, the power supply converting the alternating current to a direct current source; wherein when said housing is inserted within the cassette player, actuation of the power generator allows the digital cassette cartridge to play back digital audio files.

7. A Digital Cassette Cartridge according to claim 6, wherein the magnetic object is a magnetic disk.

8. A Digital Cassette Cartridge according to claim 6, wherein a diameter of the second wheel is smaller than a diameter of the first wheel.

9. A Digital Cassette Cartridge according to claim 6, wherein the first wheel drives the second wheel by friction.

10. A Digital Cassette Cartridge according to claim 6, wherein the first wheel drives the second wheel through a transmission belt.

\* \* \* \* \*